United States Patent [19]

Sakata et al.

[11] Patent Number: 4,819,980

[45] Date of Patent: Apr. 11, 1989

[54] BODY MOUNTING ARRANGEMENT FOR TRUCK

[75] Inventors: Tetshin Sakata, Tokyo; Kazuto Kuzuu, Hatano City; Hideo Ito, Yokohama; Akira Oouchi, Yokosuka, all of Japan

[73] Assignee: Nissan Motor Company, Ltd., Japan

[21] Appl. No.: 1,327

[22] Filed: Jan. 7, 1987

[30] Foreign Application Priority Data

Jan. 10, 1986 [JP] Japan .................. 61-3135

[51] Int. Cl.4 .................................. B62D 23/00
[52] U.S. Cl. .................. 296/35.1; 296/190; 180/89.13
[58] Field of Search .............. 296/35.1, 190; 180/89.12, 89.13; 267/63 R, 63 A

[56] References Cited

U.S. PATENT DOCUMENTS

| | | | |
|---|---|---|---|
| 2,769,656 | 11/1956 | Lee | 296/35.1 |
| 3,010,757 | 11/1961 | Hoan | 296/35.1 |
| 3,841,694 | 10/1974 | Merkle | 296/35.1 |
| 3,851,913 | 12/1974 | Knoth | 296/35.1 |
| 4,203,499 | 5/1980 | Miyata | 296/35.1 |

FOREIGN PATENT DOCUMENTS 61-3135 10/1984 Japan .

Primary Examiner—Robert R. Song
Attorney, Agent, or Firm—Lowe, Price, Leblanc, Becker & Shur

[57] ABSTRACT

A body mounting arrangement is proposed wherein a bonnet type body is mounted on a frame. The body includes a cabin and is provided with a first pair of mounting sites at a front portion thereof, a second pair of mounting sites at a front portion of the cabin floor, and a third pair of mounting sites at a rear portion of the cabin floor. First and second pairs of compression type mount rubbers are disposed between the first and second pairs of mounting sites and frame, respectively. A pair of shear type mount rubbers are disposed between the third pairs of mounting sites and frame.

2 Claims, 3 Drawing Sheets ($K_1 = K_2$)

($K_1 \ll K_2$)

BODY MOUNTING ARRANGEMENT FOR TRUCK

BACKGROUND OF THE INVENTION

The present invention relates to a body mounting arrangement for a truck, and more particularly to a body mounting arrangement whereby a bonnet type body is supported on a frame.

It is conventional practice to support a bonnet type body on a frame via a plurality of pairs of mount rubbers between the body and the frame. More specifically, a first pair of mount rubbers are disposed to support the front of the body, a second pair of mount rubbers to support the front portion of the floor of the cabin, and a third pair of mount rubbers to support the rear portion of the floor. There are two types of mount rubbers which are widely used for this purpose. One type may be called as a "compression type mount rubber" which is adapted to be elastically compressed to bear vertical stress occurring when the body moves vertically relative to the frame, and to elastically shear to bear horizontal stress occurring when the body moves horizontally relative to the frame. Besides, the mount rubber of this type show a higher stiffness coefficient upon bearing the vertical stress, and a lower stiffness coefficient upon bearing the horizontal stress. The other type may be called a "shear type mount rubber" which is adapted to elastically shear to bear vertical stress occurring when the body moves horizontally relative to the frame, and to be elastically compressed to bear horizontal stress occurring when the body moves horizontally relative to the frame. Besides, the mount rubber of this type show a smaller stiffness coefficient upon bearing the vertical stress, and a larger stiffness coefficient upon bearing the horizontal stress.

In the case where a body is supported on the frame by mount rubbers of the compression type only, the rear portion of the cabin tends to shake laterally although vertical impact and longitudinal impact that are applied to the frame are damped and transmission of such impacts to the body is reduced to a sufficiently low level, and vibration of the frame is prevented from being transmitted to the body thereby suppressing the noise level within the cabin to a sufficiently low level.

In order to solve the above mentioned problem, it has been proposed in Laying-open Japanese Patent Application No. 59-186783 to use the compression type mount rubbers for supporting the front of the body on the frame, and the shear type mount rubbers for supporting the frame portion and rear portion of the floor of the cabin on the frame.

Applicants are also aware, as a known practice, of using compression type mount rubbers for supporting the front of the body on the frame, shear type mount rubbers for supporting the front portion of the cabin floor, and compression type mount rubbers for supporting the rear portion of the floor.

In the above mentioned conventional body mounting arrangements, since the front of the body and the front portion of the floor of the cabin where first and second pairs of mount rubbers support are displaced to the front of the center of gravity of the cabin, the combined equivalent stiffness coefficient, in the horizontal direction, of the first and second pairs of mount rubbers are equal to or greater than the combined stiffness coefficient of the third pair of mount rubbers supporting the rear portion of the floor of the cabin and displaced to the rear of the center of gravity of the cabin. Thus, the rear portion of the floor of the cabin is subject to lateral shake with a large amplitude. This degrades riding comfort of the occupants in the cabin. This lateral movement of the cabin will become the maximum at resonant frequency ranging from 7 to 12 Hz. If there is non-uniformity in tire and/or imbalance between tires, such lateral shake occurs during vehicle operating speeds from 50 to 90 km/h.

An object of the present invention is to provide an improved body mounting arrangement which is effective in reducing the amplitude of lateral shake which the rear portion of the floor of the cabin is subject to, while effectively alleviating transmission of vertical and longitudinal impacts applied to the chassis to the cabin and the transmission of vibrations of the frame to the cabin.

SUMMARY OF THE INVENTION

According to the present invention, a first pair of mount rubbers support the front of a bonnet type body on a frame, a second pair of mount rubbers support the front portion of floor of a cabin of the body on the frame, and a third pair of mount rubbers support the rear portion of the floor of the cabin of the body on the frame. The first and second pairs of mount rubbers are constructed and arranged such that, when the body moves vertically relative to the frame, they are elastically compressed to bear the stress due to such vertical movement, while when the body moves horizontally relative to the frame, they elastically shear to bear the stress due to such horizontal movement. The third pair of mount rubbers are constructed and arranged such that, when the body moves vertically relative to the frame, they elastically shear to bear the stress due to such vertical movement, while when the body moves horizontally relative to the chassis, they are elastically compressed to bear the stress due to such horizontal movement.

DETAILED DESCRIPTION OF THE INVENTION

Figure 1:
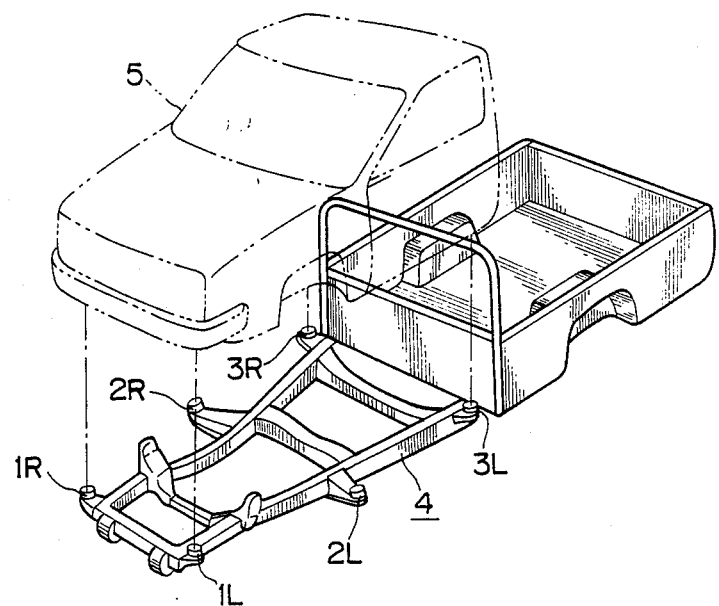
FIG. 1 is a perspective plan view of a frame of a truck with a bonnet type body shown in phantom.

Referring to FIG. 1, the reference numeral 4 designates a frame of a truck. The reference numeral 5 designates a bonnet type body with a cabin. The body 5 has a first pair of mounting sites to be supported on the frame 4 by a first pair of mount rubbers 1L and 1R, a second pair of mounting sites to be supported on the frame 4 by a second pair of mount rubbers 2L and 2R, and a third pair of mounting sites to be supported on the frame 4 by a third pair of mount rubbers 3L and 3R. The first pair of mounting sites are located near the front of the body 5. The second pair of mounting sites are located at a front portion of the cabin floor of the body 5. The third pair of mounting sites are located at a rear portion of the cabin floor of the body 5. This arrangement of mounting sites is well known and further detailed description is hereby omitted.

Figure 2:
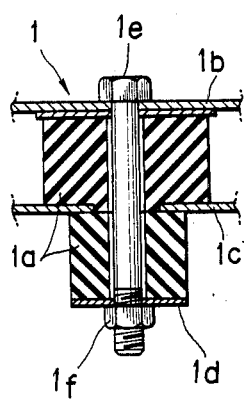
FIG. 2 is a vertical sectional view of one of a first pair of compression type mount rubbers.

Referring to FIG. 2, each of the first pair of mount rubbers 1L and 1R is illustrated in section and designated at reference numeral 1. The mount rubber 1 is of the so-called compression type. It is connected to one of the first pair of mounting sites of the body 5 via a bracket 1b and the frame 4 via a bracket 1c. Insulator rubbers 1a are held between the bracket 1b and a support ring 1d by a bolt 1e and a nut 1f. One of the insulator rubbers 1a is disposed between the brackets 1b and 1c, while the other being disposed between the bracket 1c and the support ring 1d.

Figure 3:
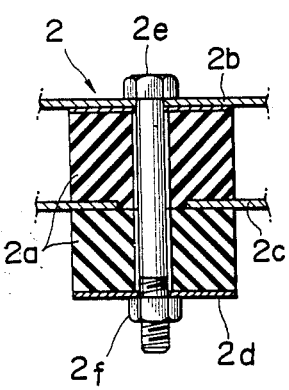
FIG. 3 is a vertical sectional view of one of a second pair of compression type mount rubbers.

Referring to FIG. 3, each of the second pair of mount rubbers 2L and 2R is illustrated in section and designated at reference numeral 2. The mount rubber 2 is of the so-called compression type. It is connected to one of the second pair of mounting sites of the body 5 via a bracket 2b and the frame 4 via a bracket 2c. Insulator rubbers 2a are held between the bracket 2b and a support ring 2d by a bolt 2e and a nut 2f. One of the insulator rubbers 2a is disposed between the brackets 2b and 2c, while the other being disposed between the bracket 2c and the support ring 2d.

Figure 4:
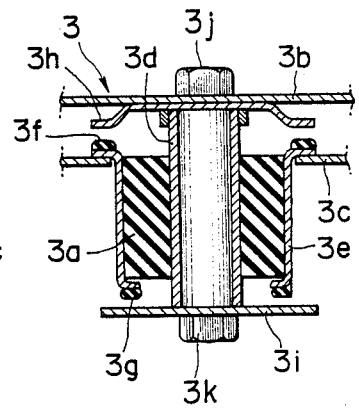
FIG. 4 is a vertical sectional view of one of a third pair of shear type mount rubbers

Referring to FIG. 4, each of the third pair of mount rubbers 3L and 3R is illustrated in section and designated at reference numeral 3. The mount rubber 3 is of the shear type. It is connected to one of the third pair of mounting sites of the body 5 via a bracket 3b and the frame 4 via a bracket 3c. With a bolt 3j and a nut 3k, an inner sleeve 3d is secured to the bracket 3b with an upper bound stop plate 3h interposed between the upper end of the inner sleeve 3d and the bracket 3b, and with a bottom bound stop plate 3i interposed between the lower end of the inner sleeve 3d and the nut 3k. The bolt 3j extends through the inner sleeve 3d. An outer sleeve 3e surrounding the inner sleeve 3d has an upper flange secured to the bracket 3c. Disposed between the inner sleeve 3d and the outer sleeve 3e is a sleeve-like insulator rubber 3a. The insulator rubber 3a has its inner cylindrical surface fixedly connected to the inner sleeve 3d and its outer cylindrical surface fixedly connected to the outer sleeve 3e. An upper stop rubber ring 3f is provided on the flange end of the outer sleeve 3e and a lower stop rubber 3g is provided on an inwardly curled end of the outer sleeve 3e.

In the present embodiment, the mount rubbers 1, 2, and 3 are designed such that although they exhibit the same stiffness coefficient of 40 kg/mm for vertical movement of the body 5 relative to the frame 4, the first and second mount rubbers 1 and 2 exhibit different stiffness coefficients falling in a range from 15 kg/mm to 22 kg/mm for lateral movement of the body 5 relative to the frame 4, and the third mount rubber 3 exhibits a stiffness coefficient of 140 kg/mm for lateral movement of the body 5 relative to the frame 4.

Figure 5:
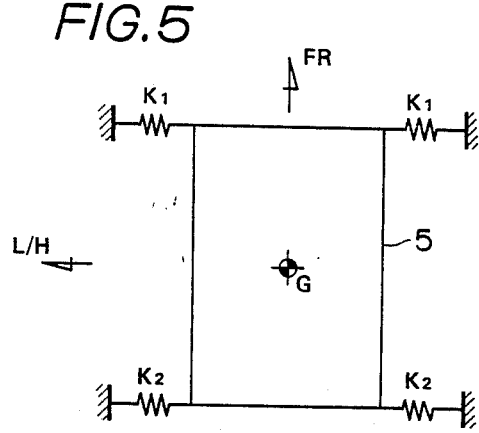
FIG. 5 is a vibration system model of a cabin of the bonnet type body.
Figure 6:
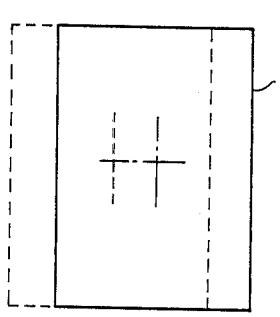
FIGS. 6 and 7 show vibration models when the rear stiffness coefficient $K_2$ is equal to the front stiffness coefficient $K_1$.
Figure 7:
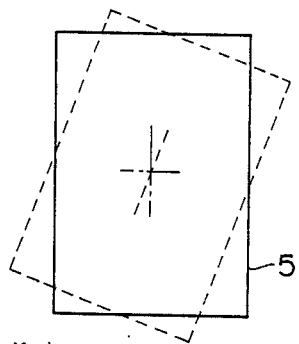

The vibration system, within horizontal plane, of the body 5 can be simply expressed by a vibration model as illustrated in FIG. 5. Referring to FIG. 5, the reference character $K_1$ is the combined equivalent stiffness coefficient, in lateral direction, of the mount rubbers 1R and 2R or that of the mount rubbers 1L and 2L which mount rubbers are displaced to the front of the center of gravity G, and the reference character $K_2$ is the combined equivalent stiffness coefficient, in lateral direction, of the mount rubber 3R or that of the mount rubber 3L. In this illustrated vibration model, two freedoms, i.e., on in lateral direction and the other in angular direction about the vertical axis are given, so that there exist two vibration modes having two eigenvalues, respectively. If $K_1$ is equal to $K_2$, the first order vibration mode becomes lateral vibration as shown in FIG. 6, and the second order vibration mode becomes angular vibration about the vertical axis as shown in FIG. 7.

Figure 8:
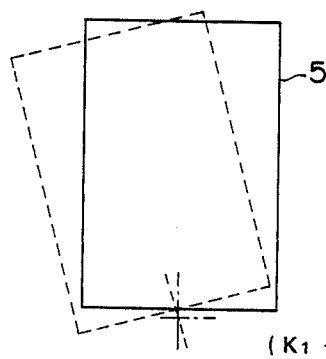
FIG. 8 and 9 show vibration models when the rear stiffness coefficient $K_2$ is considerably larger than the front stiffness coefficient $K_1$.
Figure 9:
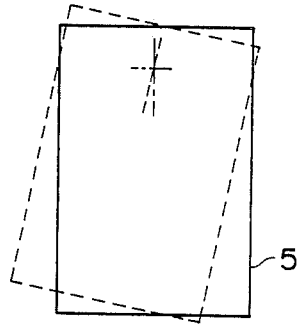

According to the present embodiment, $K_2$ is considerably larger than $K_1$. Let us consider this case. The vibration modes given in this case are both angular vibration. The first order vibration mode having a lower eigenvalue becomes an angular vibration about a vertical axis located near the rear end of the cabin as shown in FIG. 8. The second order vibration mode having a higher eigenvalue becomes an angular vibration about a vertical axis located near the front end of the cabin as shown in FIG. 9. Since the first vibration mode occurs within a range from 8 Hz to 12 Hz, it will be understood that setting $K_2$ considerably larger than $K_1$ is effective in reducing lateral shake at occupant's sitting position during operation at frequencies falling in this frequency range.

In the second order vibration mode as illustrated in FIG. 9, the amplitude of lateral shake at occupant's sitting position increases and thus ride feel is deteriorated at frequencies falling in a high frequency range from 12 Hz to 20 Hz, i.e., there is expected to occur considerably great lateral shake due to possible tyre imbalance during running at vehicle speed higher than 90 km/h. However, in the case of a truck, the yaw resonant frequency of engine usually exists around frequencies near 14 Hz so that the engine serves as a dynamic damper to reduce the lateral shake at this high frequency range. Therefore, no practical problem arises.

Figure 10:
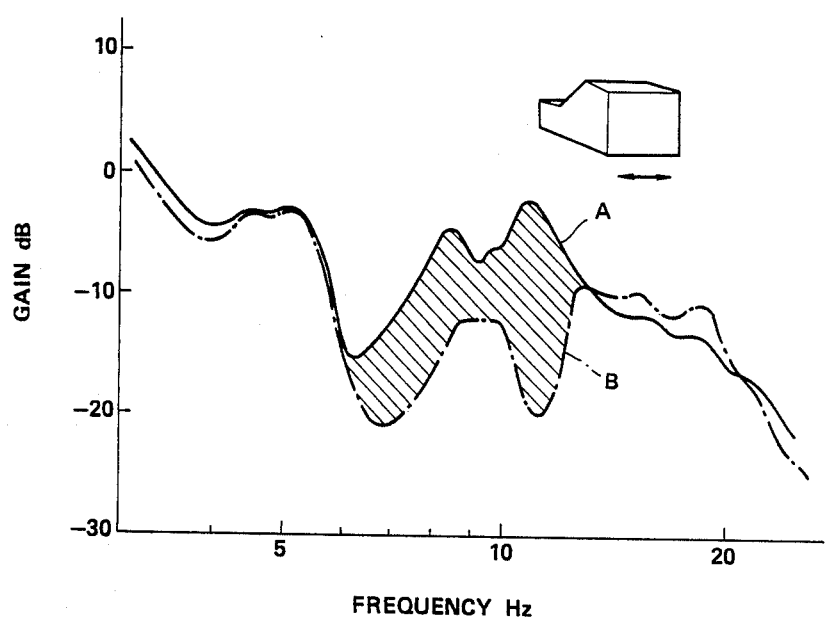
FIG. 10 is a graph with the vertical axis of gain and the horizontal axis of frequency (Hz) showing gain vs., frequency characteristic curves A and B plotting the result of vibration test.

FIG. 10 shows two curves A and B obtained at vibration test of a truck as illustrated in FIG. 1. The test procedure is such that the front wheels of the truck are placed on a vibration platform which is subject to lateral vibrations with amplitude of +1 mm at various frequencies extending around 10 HZ. The measurement is made at middle point near the rear end of the cabin. The vertical axis shows a gain which is expressed by a ratio of the result of measurement at the measurement point to the result of measurement at the vibration platform which the front wheels are placed on. The horizontal axis shows the frequency of applied vibration in terms of Hz. The test is conducted for different mounting arrangements, one according to one of the conventional art, the other according to the present invention. In the conventional mounting arrangement, the mount rubbers 1R and 1L have a stiffness coefficient, in lateral direction, of 15 kg/mm, the mount rubbers 2R and 2L have a stiffness coefficient, in lateral direction, of 22 kg/mm, and the mount rubbers 3R and 3L have a stiffness coefficient, in lateral direction, of 18 kg/mm, the mount rubbers 1R, 1L, 2R, and 2L are of the compression type and displaced to the front of the center of gravity, and the mount rubbers 3R and 3L are also of the compression type and displaced to the rear of the center of gravity. In the mounting arrangement according to the present invention, the mounting rubbers 1R and 1L has the stiffness coefficient of 15 kg/mm and the mount rubbers 2R and 2L have the stiffness coefficient of 22 kg/mm, and they are all of the compression type. Third pair of mount rubbers 3R and 3L are of the shear type as illustrated in FIG. 4 and have the stiffness coefficient of 140 kg/mm. The results obtained by the test conducted with the conventional mounting arrangement are shown by the fully drawn curve A, whereas the results obtained by the test conducted with the mounting arrangement according to the present invention are shown by the phantom line curve B.

Comparing the curve B with the curve A, it will be readily understood that the amplitude of lateral shake has been reduced according to the present invention at frequencies ranging from 8 Hz to 12 Hz as indicated by the shadowed region. This contributes much to enhancement of ride comfort.

Since according to the present invention only a single pair of shear type mount rubbers are used which are relatively expensive as compared to the compression type mount rubbers, the mounting arrangement proposed according to the present invention is advantageous over the arrangement proposed by the before mentioned Laying-open Japanese Patent Application No. 59-186783 in that the former is less expensive than the latter.

What is claimed is:

1. In a truck:
   a frame;
   a bonnet type body including a cabin with a floor, said body having a first pair of mounting sites located near the front thereof, a second pair of mounting sites located at a front portion of said floor, and a third pair of mounting sites at a rear portion of said floor;
   a first pair of mount rubbers operatively connected between said first pair of mounting sites and said frame;
   a second pair of mount rubbers operatively connected between said second pair of mounting sites and said frame; an
   a third pair of mount rubbers operatively connected between said third pair of mounting sites and said frame;
   said first and second pairs of mount rubbers being generally identical to each other and constructed and arranged such that, when said body moves vertically relative to said frame, they are elastically compressed to bear the stress due to such vertical movement, while when said body moves horizontally relative to said frame, they elastically shear to bear the stress due to such horizontal movement;
   said third pair of mount rubbers being different from the first and second pairs and constructed and arranged such that, when said body moves vertically relative to said frame, they elastically shear to bear the stress due to such vertical movement, while when said body moves horizontally relative to said frame, they are elastically compressed to bear the stress due to such horizontal movement, wherein said first and second pairs of mounting sites are displaced forwardly of the center of gravity of said body, and said third pair of mounting sites are displaced rearwardly of the center of gravity of said body, wherein said third pair of mount rubbers exhibit a greater stiffness coefficient upon bearing the stress due to the horizontal movement than the combined equivalent stiffness coefficient of said first and second pairs of mount rubbers.

2. In a truck:
   a frame;
   a bonnet type body including a cabin with a floor, said body having a first pair of mounting sites located near the front thereof, a second pair of mounting sites located at a front portion of said floor, and a third pair of mounting sites at a rear portion of said floor;
   a first pair of mount rubbers operatively connected between said first pair of mounting sites and said frame;
   a second pair of mount rubbers operatively connected between said second pair of mounting sites and said frame; and
   a third pair of mount rubbers operatively connected between said third pair of mounting sites and said frame;
   said first and second pairs of mount rubbers being constructed and arranged such that, when said body moves vertically relative to said frame, they are elastically compressed to bear the stress due to such vertical movement, while when said body moves horizontally relative to said frame, they elastically shear to bear the stress due to such horizontal movement;
   said third pair of mount rubbers being constructed and arranged such that, when said body moves vertically relative to said frame, they elastically shear to bear the stress due to such vertical movement, while when said body moves horizontally relative to said frame, they are elastically compressed to bear the stress due to such horizontal movement, wherein said first and second pairs of mounting sites are displaced forwardly of the center of gravity of said body, and said third pair of mounting sites are displaced rearwardly of the center of gravity of said body, wherein said third pair of mount rubbers exhibit a greater stiffness coefficient upon bearing the stress due to the horizontal movement than the combined equivalent stiffness coefficient of said first and second pairs of mount rubbers, wherein said first and second pairs of mount rubbers have a stiffness coefficient within the range of about 15–22 kg/mm to counteract lateral movement of said body and wherein said third pair of mount rubbers has a stiffness coefficient to about 140 kg/mm upon bearing the stress due to lateral movement of said body.

* * * * *